United States Patent [19]
Ward et al.

[11] 3,973,921
[45] Aug. 10, 1976

[54] NON-DETACHABLE TAB STOCK

[75] Inventors: Bennie R. Ward, Chesterfield County; Donald R. Geisler, Chester, both of Va.

[73] Assignee: Reynolds Metals Company, Richmond, Va.

[22] Filed: Apr. 1, 1975

[21] Appl. No.: 563,966

Related U.S. Application Data

[62] Division of Ser. No. 452,077, March 18, 1974.

[52] U.S. Cl. .............................. 29/197.5; 220/269
[51] Int. Cl.² ...................................... B32B 15/00
[58] Field of Search .................. 29/197.5; 148/12.7, 148/34, 11.5 A; 220/85 R, 85 B, 359, 309, 269

[56] References Cited
UNITED STATES PATENTS

| | | | |
|---|---|---|---|
| 2,122,535 | 7/1938 | Nock, Jr. ............................ | 29/197.5 |
| 2,454,312 | 11/1948 | Fritzlen ............................. | 29/197.5 |
| 3,310,389 | 3/1967 | Doyle ................................ | 29/197.5 |
| 3,359,085 | 12/1967 | Anderson ........................... | 29/197.5 |
| 3,498,849 | 3/1970 | Munday ........................ | 148/11.5 A |
| 3,857,973 | 12/1974 | McKee et al. ................ | 29/197.5 X |
| 3,878,871 | 4/1975 | Anthony ............................ | 29/197.5 |
| 3,881,883 | 5/1975 | Fritzlen ............................. | 29/197.5 |

*Primary Examiner*—Arthur J. Steiner
*Attorney, Agent, or Firm*—Glenn, Lyne, Gibbs & Clark

[57] ABSTRACT

An aluminum-alloy tab stock, useful for non-detachable tabs having high yield strength and high bending endurance, and a process for manufacture thereof from a heat treatable core aluminum alloy and a non-heat treatable cladding aluminum alloy by arranging the alloys as layers of a composite, bonding the layers by hot-rolling the composite to a thickness reduction of 75–90%, cold-rolling the thinned composite to an additional thickness reduction of 60–70% to form the tab stock, solution heat treating the tab stock and rapidly cooling the tab stock. Optionally, aging to a selected temper may additionally be used.

5 Claims, No Drawings

NON-DETACHABLE TAB STOCK

This application is a division of Ser. No. 452,077 filed Mar. 18, 1974.

BACKGROUND OF THE INVENTION

1. Field of the Invention

This invention relates to an improvement in easy-open containers provided with a severable tear strip in one end wall thereof and a pull device for initiating severance thereof. The invention particularly relates to lever-type pull devices having both rigidity and flexing endurance. It additionally relates to clad sheet materials having both bending strength and folding endurance and especially relates to aluminum alloy-clad aluminum alloys wherein such bending strength and folding endurance are created and/or enhanced by a selected solution heat treatment and/or aging to a selected temper. It specifically relates to use of such aluminum alloy-clad aluminum alloys for such lever-type pull devices in easy-open containers having means for retaining both the tear strip and the pull tab after severance and means for refastening a retained pull tab to the end wall of the container.

2. Review of the Prior Art

It is common knowledge that beverage containers and the like having an easy-open end wall have become extremely popular, and it is a frequent experience that the rupture-initiating devices therefor, such as sheet-metal rings and elongated tabs, often break when initially bent or when unusual effort is made in order to initiate rupture of an end-wall panel. A solution for such premature tab failure is proposed in U.S. Pat. No. 3,401,823, comprising a reinforced sheet-metal tab formed as a double layer that becomes a three-layer laminate with the can end, whereby the tab is greatly stiffened in its forward portion and the radius of bending is increased.

As a part of the ubiquitous ecological furor, the widespread litter and safety problems created by these sharp-edged pull rings, tabs, and the like have been the subject of much adverse comment. As a solution for the throwaway tab problem, a non-detachable tab, having three hingeably attached components, is disclosed in U.S. Pat. No. 3,744,662, preferred materials for this tab being resilient plastic materials such as polypropylene, polyvinyl chloride, nylon, and the like.

As another solution therefor, a co-pending application, Ser. No. 378,448, filed July 12, 1973, discloses a practical easy-open container having a rupture-initiating device which remains attached to the end wall thereof and which is refastenable to the end wall after use, thereby requiring high bending strength and folding endurance. However, this device tends to run squarely into an important practical problem.

The problem arises because tabs requiring high bending strength and bending endurance have customarily been manufactured of steel or other metallic but non-aluminum materials. As a result, if an attempt is made to recycle the entire can, the non-aluminum tab must be removed. The costs of tab removal can readily inhibit recycling for pollution control and raw material conservation.

If an all aluminum-alloy tab could be non-detachably fastened to the end wall of an easy-open can, recycling of the entire can without tab removal would be feasible and economically practicable. However, manufacture of such tabs wholly of aluminum alloys has previously not seemed to be practicable because their low strength and brittleness would greatly aggravate the problem of premature tab failures. Clad aluminum alloys have been suggested for solving many prior art problems requiring high strength, but none are known to have been considered for making rupture-initiating tabs.

Improving the strength of aluminum alloys by heat treatment, cold working, and the like is also well known, and such heat and work treatments have been proposed for creating differential strength properties in some clad aluminum alloys, examples being treatment of aluminum-magnesium-silicon alloys to obtain improved creep resistance at desired static tensile properties in U.S. Pat. No. 3,310,389, manufacture of high-luster aluminum hub caps having high mechanical strength after treating a composite of commercial aluminum alloy clad with high-purity aluminum in U.S. Pat. No. 3,093,459, and fabricating a composite sheet metal panel having layers of different yield strength in U.S. Pat. Nos. 3,354,531 and 3,108,361. However, the art does not teach the treatment of a composite aluminum alloy for increasing both strength and bending endurance thereof.

SUMMARY OF THE INVENTION

The object of this invention is to provide an all aluminum-alloy tab stock for an easy-open aluminum can.

An additional object is to provide a treatment method capable of creating selected properties in the interior and exterior portions of all aluminum-alloy tabs.

In accordance with these objects and the spirit of this invention, a composite sheet-metal tab stock is herein provided which is made of a heat treatable core aluminum alloy and a nonheat treatable cladding aluminum alloy, and treatment methods are also herein provided which create selected properties in the core and in the cladding whereby high bending strength and flexing endurance are obtained.

Essentially, this invention provides a composite having a cladding which is very soft and ductile and a core which is very strong, whereby both bending strength and bending endurance of tabs made therefrom approach those of steel. Specific processes for heating, hot rolling, solution heating, quenching, cold rolling, and aging to a selected temper are disclosed herein for various aluminum alloy composites whereby the necessary differentials in properties between core and claddings is selectively produced.

This invention generally comprises processes for forming a clad tab stock from a core aluminum alloy and a cladding aluminum alloy by arranging the alloys as suitable layers in a composite or sandwich, heating the composite, hot-rolling the hot composite to a thickness reduction that is sufficient for adequate bonding of the layers by pressure welding, rolling the bonded composite (while cold or after reheating) to the final tab thickness, solution heat treating the thinned composite, and rapidly cooling the heat-treated stock, followed by a selected tempering sequence, such as either T4 tempering under ambient conditions for at least seven days or T6 tempering at an elevated temperature for 4-24 hours to create a T6 temper in the core, whereby both stiffness and bending endurance are simultaneously imparted to a sufficient degree that the clad tab stock is useful to make tabs for all-aluminum cans whose construction requires tabs having high bending strength for puncturing the can top wall and high flexing endurance for refastening the tab to the can top wall.

DESCRIPTION OF THE PREFERRED EMBODIMENTS

For experimental manufacture of composite tab stocks according to this invention, a four-high breakdown mill and a Stanat rolling mill, as the finishing mill, were used. The core stocks were rolled on the breakdown mill to a thickness of 0.250 inches as 8-inch × 8-inch specimens, and the cladding stocks were rolled on the breakdown mill to a suitable thickness for obtaining the desired proportion of clad material in the composite.

In each example except No. 4, the core and cladding stocks were assembled into a three-layer composite after wire brushing all surfaces to be bonded. The composite or sandwich was heated for 20 minutes at about 900°F. and then hot rolled immediately in order to bond the layers together. In some instances, the unbonded composite was hot-rolled to obtain a reduction of 20–40% at a thickness of 0.220–0.250 inch, reheated at 850°F., again hot-rolled to obtain a total reduction of 70–90% at a thickness of about 0.050 inch, and finally cold-rolled on the finishing mill to the final thickness of about 0.018 inch, accomplishing an additional reduction of 60–70% from the hot-rolled thickness. In other instances, the unbonded composite was hot-rolled to the intermediate thickness of about 0.050 inch without reheating and similarly cold-rolled to the final thickness of about 0.018 inch. However, the presence of an additional reheating step, which was adopted whenever work input became excessive, is believed to have been made immaterial by the subsequent solution heat treatment.

As reported in the accompanying table, the clad tab stocks were tested for Tensile Strength in accordance with ASTM-B557 testing procedure, for Yield Strength in accordance with ASTM-B557 testing procedure (both tests furnishing test results as 1000 pounds per square inch, KSI), for Elongation in accordance with ASTM-B557, for bending endurance in a Transverse Lab Vise Bend Test (hereinafter TLVBT) as described hereinafter, and for bending endurance in a Bend Fixture Test (hereinafter BFT) as described hereinafter, both bending tests being reported as the average number of bends from and to the starting position on five replicate samples. Most of the composites were aged to T4 temper, but some were aged to T6 temper and are designated in the table by the suffix "A". For the Transverse Lab Vise Bend Test (TLVBT), ¼-inch wide coupons are sheared from the material, parallel to the rolling direction of the material. The coupon is then clamped between the jaws of a standard 3½ inch shop vise. Clamping is done such that the jaws are perpendicular to the rolling direction of the material. After clamping, the coupon is bent to a 90° angle against one of the jaws. The axis of bend is perpendicular to rolling direction. After bending to a 90° angle, the sample is restraightened on the same axis. The bending and restraightening constitutes one cycle. This flexing continues until the sample fractures, with the number of cycles to fracture being counted.

For the Bend Fixture Test (BFT), ¼-inch wide coupons are sheared parallel to the rolling direction of the metal. The coupon is clamped in the bend test fixture such that the axis of bend is perpendicular to the rolling direction of the coupon. A 10 pound weight is clamped onto the free end of the coupon below the test fixture. By moving the handle of the bend test fixture, the cou-

| Ex. No. | Stocks Core | Stocks Clad | Clad, % of Composite per side | SHT Time, min. | SHT Temp, °F. | Core Temper Treatment, T- | Tensile, KSI | Yield, KSI | Elongation % | Mechanical Tests TLVBT, No. | BFT, No. | Performance on Can Break Top Wall | Performance on Can Flex Test, No. |
|---|---|---|---|---|---|---|---|---|---|---|---|---|---|
| 1 | 2036 | — | 0 | 15 | 925 | 4 | 51.6 | 28.8 | 20.5 | 2.6 | 3.5 | yes | 1 |
| 1A | 2036 | — | 0 | 15 | 925 | 6 | 55.6 | 48.1 | 8.8 | 1.9 | 2.0 | yes | 1 |
| 2 | 2048 | 1235 | 25 | 12 | 920 | 4 | 37.7 | 23.4 | 21.0 | 7.7 | 8.3 | yes | 4.0 |
| 3 | 2048 | 1235 | 25 | 20 | 920 | 4 | 40.9 | 24.3 | 18.0 | 7.4 | 7.4 | yes | 4.5 |
| 4 | 2048 | 1235 | 50 | 12 | 920 | 4 | 40.4 | 24.9 | 22.0 | 5.4 | 4.6 | yes | 2.75 |
| 5 | 2048 | 1235 | 0 | 20 | 920 | 4 | 65.3 | 38.7 | 21.5 | 2.2 | 3.0 | yes | 2.5 |
| 6 | 2048 | 1235 | 5 | 20 | 920 | 4 | 59.1 | 35.5 | 18.3 | 3.2 | 4.2 | yes | 2.75 |
| 7 | 2048 | 1235 | 10 | 20 | 920 | 4 | 54.5 | 32.4 | 18.3 | 3.9 | 4.5 | yes | 3.0 |
| 8 | 2048 | 1235 | 15 | 20 | 920 | 4 | 51.0 | 30.1 | 20.3 | 4.3 | 5.3 | yes | 3.25 |
| 9 | 2048 | 1235 | 20 | 20 | 920 | 4 | 44.8 | 26.4 | 19.0 | 5.8 | 6.5 | yes | 3.75 |
| 10 | 2048 | 1235 | 30 | 20 | 920 | 4 | 34.8 | 20.7 | 17.0 | 8.2 | 11.6 | yes | 5.25 |
| 11 | 2048 | 1235 | 35 | 20 | 920 | 4 | 29.6 | 17.1 | 18.8 | 12.9 | 12.2 | yes | 6.75 |
| 12 | 2048 | 1235 | 40 | 20 | 920 | 4 | 23.7 | 13.0 | 18.8 | 10.5 | 15.0 | no | — |
| 13 | 6060 | — | 0 | 20 | 1000 | 4 | 39.7 | 20.9 | 19.8 | 2.8 | 3.2 | yes | 2.0 |
| 14 | 6061 | 1235 | 25 | 20 | 1000 | 4 | 23.9 | 13.4 | 20.5 | 6.7 | 6.7 | no | — |
| 15 | 2036 | 1235 | 10 | 20 | 920 | 4 | 44.5 | 23.7 | 21.0 | 5.0 | 5.3 | yes | 2.8 |
| 16 | 2024 | 1235 | 25 | 20 | 920 | 4 | 43.9 | 27.0 | 14.8 | 5.5 | 7.4 | — | — |
| 17 | 2036 | 3003 | | 20 | 920 | 4 | 39.6 | 21.9 | 14.5 | 4.4 | 4.7 | yes | 2.5 |
| 18 | 7075 | 1235 | 25 | 20 | 880 | 6 | 51.1 | 39.9 | 11.0 | 3.4 | 5.7 | — | — |
| 19 | 2036 | 1235 | 20 | 20 | 920 | 4 | 35.4 | 18.2 | 21.0 | 4.8 | 8.6 | yes | 3.2 |
| 19A | 2036 | 1235 | 20 | 20 | 920 | 6 | 35.7 | 28.9 | 9.3 | — | — | yes | 4.5 |
| 20 | 2036 | 8079 | 10 | 20 | 920 | 4 | 42.4 | 22.6 | 20.5 | 3.1 5.1 | yes | 2.5 | |
| 21 | 2036 | 8079 | 15 | 20 | 920 | 4 | 40.0 | 21.4 | 21.3 | 4.0 | 6.3 | yes | 2.7 |
| 22 | 2036 | 8079 | 20 | 20 | 920 | 4 | 35.9 | 18.7 | 21.8 | 4.5 | 8.8 | yes | 4.5 |
| 23 | 2036 | 8079 | 25 | 20 | 920 | 4 | 32.2 | 17.4 | 19.0 | 5.2 | 8.7 | yes | 4.0 |
| 23A | 2036 | 8079 | 25 | 20 | 920 | 6 | 30.9 | 24.0 | 9.0 | — | — | yes | 4.5 |
| 24 | 2036 | 6201 | 10 | 20 | 920 | 4 | 45.6 | 24.5 | 19.0 | 2.6 | 3.8 | yes | 2.2 |
| 25 | 2036 | 6201 | 15 | 20 | 920 | 4 | 44.6 | 24.6 | 20.3 | 2.9 | 4.0 | yes | 2.5 |
| 26 | 2036 | 6201 | 20 | 20 | 920 | 4 | 42.0 | 22.0 | 20.0 | 3.0 | 4.7 | yes | 2.5 |
| 27 | 2036 | 8079 | 30 | 20 | 920 | 4 | 28.1 | 14.6 | 20.0 | 5.7 | 9.4 | — | — |
| 27A | 2036 | 8079 | 30 | 20 | 920 | 6 | 26.1 | 19.4 | 7.3 | 7.2 | 8.7 | — | — |
| 28 | 2036 | 1100 | 25 | 20 | 920 | 4 | 34.0 | 19.0 | 13.0 | 5.2 | 6.4 | — | 4.7 |
| 28A | 2036 | 1100 | 25 | 20 | 920 | 6 | 35.7 | 26.2 | 11.0 | 5.6 | 5.7 | — | 4.7 |
| 29 | 2036 | 1100 | 30 | 20 | 920 | 4 | 30.8 | 16.8 | 21.5 | 5.2 | 7.3 | — | 3.7 |
| 29A | 2036 | 1100 | 30 | 20 | 920 | 6 | 29.6 | 21.6 | 13.0 | 6.0 | 6.9 | — | 4.8 | pon is flexed through a 90° angle and returned to the start. All bending is done across a zero T radius. The bending and restraightening constitutes a cycle. The flexing continues until the sample fractures, with the number of cycles to fracture being counted.

The clad tab stocks were fabricated into non-detachable tabs fastened to a top wall of an aluminum can having a partially severable panel adapted to be broken inwardly by the forward portion of the tab when the rear portion of the tab is lifted to urge the forward portion against the panel, both tabs and can being made according to the teaching of the co-pending U.S. patent application Ser. No. 378,448. These tabs were tested at least in duplicate by bending, puncturing the can top wall, and refastening the tab thereto. Results are reported in the accompanying table as to capacity to break the top wall and as to the number of flexes, each flex being an upward and a downward sequence, that the tab could endure before breaking.

The minimum yield requirement is 20 KSI, and the minimum number of flexes for a non-detachable tab is approximately 6.0 in order to equal the flexing endurance expected of a steel tab.

EXAMPLES 2–12

Composites having 2048 aluminum alloy as the core and 1235 aluminum alloy as the cladding demonstrated that a doubly clad tab (Examples 2 and 3) was superior to a singly clad tab (Example 4), that both Mechanical Tensile and Yield values were linearly and inversely related to cladding percentage, and that the values for all three of the flexing tests were directly and increasingly greater with greater cladding percentages. The clad tab of Example 11 bent excessively while breaking the top wall, thus indicating that 35% double cladding was too much for this combination of alloys.

EXAMPLES 1, 1A, 19, and 19A

Composites having 2036 aluminum alloy as the core and 1235 aluminum alloy as the cladding demonstrated that a tab made out of core material alone was much too brittle and that a 20% doubly-clad tab with T4 temper was marginally strong but with T6 temper was adequately strong and had more flexing endurance (Example 19A as compared to Example 19).

EXAMPLES 20–23A, 27, 27A

Composites having 2036 aluminum alloy as the core and 8079 alloy as cladding demonstrated that doubly cladding 2036 aluminum alloy with 8079 aluminum alloy imparted yield-versus-bending-endurance properties which correlated with approximately the same negative slope but lesser intercept values for increased cladding as for the tabs having a core of 2048 alloy. Tempering to T6 significantly increased yield values with uncertain effect upon bending endurance (Examples 23A and 27A as compared to Examples 23 and 27). Moreover, the breaking strength of Example 23, after T4 tempering, was merely marginal, but the breaking strength of Example 23A, after T6 tempering, was adequate.

EXAMPLES 24, 25, and 26

Composites having 2036 aluminum alloy as the core and 6201 aluminum alloy as cladding produced results similar to those for the 8079 cladded tabs but showed that this combination of alloys produced low bending endurance.

EXAMPLES 28–29A

Composites having 2036 aluminum alloy as the core and 1100 aluminum alloy as the cladding showed that this combination of alloys was unworkable at either 25% or 30% levels and at either T4 or T6 temper. Bonds broke between layers, for example, as evidenced by blisters.

EXAMPLES 13, 14, and 16–18

These composites containing various aluminum alloys as core and cladding materials revealed that many alloy combinations were not workable. Both of the tab stocks produced from the composites of Examples 16 and 18 were severely edge cracked after rolling and producing a tab therefrom was impossible. The tab stock of Example 17 was re-rolled from plant-produced material at T6 temper.

Variations from the invention herein described will be apparent to one skilled in the art, but the invention is to be construed only according to the claims when broadly construed.

What is claimed is:

1. A doubly clad tab stock, adapted for an easy-open all-aluminum can, comprising a very strong core formed from a heat-treatable aluminum alloy and very soft and ductile claddings formed from a non-heat-treatable aluminum alloy arranged as a three-layer composit, said claddings being 10-35% of said tab stock per side, said tab stock having a high bending strength measured by a yield of at least 15 KSI, and a high flexing endurance measured by at least three flexes.

2. The doubly clad tab stock of claim 1 wherein said claddings are each 10% of said tab stock and said yield is at least 30 KSI.

3. The doubly clad tab stock of claim 1 wherein said claddings are each 20% of said tab stock and said yield is at least 25 KSI.

4. The doubly clad tab stock of claim 1 wherein said claddings are each 30% of said tab stock and said yield is at least 20 KSI.

5. The tab stock of claim 1 wherein said heat-treatable aluminum alloy is 2048 aluminum alloy and said non-heat-treatable aluminum alloy is 1235 aluminum alloy.

* * * * *